(12) United States Patent
Gomez et al.

(10) Patent No.: US 12,391,316 B2
(45) Date of Patent: Aug. 19, 2025

(54) HOOD ASSEMBLY FOR A WORK VEHICLE

(71) Applicant: CNH Industrial America LLC, New Holland, PA (US)

(72) Inventors: Lorenzo Anthony Gomez, Westmont, IL (US); Michael J. Braun, Oswego, IL (US); Robert Allen Neubauer, Bottineau, ND (US); Mark Douglas Klassen, Lockport, IL (US)

(73) Assignee: CNH Industrial America LLC, New Holland, PA (US)

( * ) Notice: Subject to any disclaimer, the term of this patent is extended or adjusted under 35 U.S.C. 154(b) by 286 days.

(21) Appl. No.: 18/072,198

(22) Filed: Nov. 30, 2022

(65) Prior Publication Data

US 2024/0174297 A1 May 30, 2024

(51) Int. Cl.
*B62D 25/12* (2006.01)
*B62D 25/10* (2006.01)
*E05F 15/70* (2015.01)

(52) U.S. Cl.
CPC ............. *B62D 25/12* (2013.01); *B62D 25/10* (2013.01); *E05F 15/70* (2015.01)

(58) Field of Classification Search
CPC ... B62D 25/10; B62D 25/12; E05Y 2900/518; E05Y 2900/536; E02F 9/0891; E05F 15/70; E05F 2201/478
USPC .................................................... 296/193.11
See application file for complete search history.

(56) References Cited

U.S. PATENT DOCUMENTS

| | | | | |
|---|---|---|---|---|
| 5,564,514 A | * | 10/1996 | Knight ................. | E05F 1/1091 180/69.21 |
| 5,749,425 A | * | 5/1998 | Cudden ................. | B62D 25/10 180/69.2 |
| 5,890,556 A | * | 4/1999 | Shearn ................. | B62D 25/12 180/69.21 |
| 6,487,754 B1 | * | 12/2002 | Keen ..................... | B62D 25/10 296/100.1 |
| 7,036,618 B2 | * | 5/2006 | Telford ................. | B62D 25/10 180/69.2 |

(Continued)

FOREIGN PATENT DOCUMENTS

| DE | 10307120 | 8/2004 |
|---|---|---|
| DE | 102007015965 | 10/2008 |
| WO | 2016075572 | 5/2016 |

OTHER PUBLICATIONS

EP Application No. 23213543, Search Report dated Apr. 24, 2024, 7 pgs.

(Continued)

*Primary Examiner* — Gregory A Blankenship
(74) *Attorney, Agent, or Firm* — Rickard K. DeMille; Rebecca L. Henkel; Peter K. Zacharias

(57) ABSTRACT

A hood assembly for a work vehicle includes a hood and a hood pivot joint configured to pivotally couple the hood to a chassis of the work vehicle. The hood pivot joint is configured to enable the hood to rotate between an open position and a closed position. The hood assembly also includes a lift mechanism having a linkage assembly pivotally coupled to the hood and configured to pivotally couple to the chassis of the work vehicle. In addition, the lift mechanism includes a linear actuator coupled to the linkage assembly. The linear actuator is configured to drive the linkage assembly to rotate the hood between the open and closed positions.

9 Claims, 7 Drawing Sheets

(56) References Cited

U.S. PATENT DOCUMENTS

| | | | | |
|---|---|---|---|---|
| 7,909,125 | B1* | 3/2011 | Keen | B62D 25/10 |
| | | | | 16/230 |
| 2006/0000653 | A1* | 1/2006 | Telford | B62D 25/10 |
| | | | | 180/69.21 |
| 2017/0226788 | A1* | 8/2017 | Conner | E05F 1/1033 |
| 2017/0313363 | A1* | 11/2017 | Plebani | B62D 25/12 |
| 2017/0342758 | A1* | 11/2017 | Grudzinski | B62D 33/0273 |
| 2020/0290682 | A1* | 9/2020 | Sasaki | B60R 21/38 |
| 2023/0159109 | A1* | 5/2023 | Nagata | B62D 25/082 |
| | | | | 180/69.2 |
| 2023/0415688 | A1* | 12/2023 | Sonoda | B60R 19/38 |
| 2024/0044105 | A1* | 2/2024 | Miki | E02F 9/0866 |
| 2024/0174297 | A1* | 5/2024 | Gomez | B62D 25/12 |
| 2024/0351552 | A1* | 10/2024 | Bartschies | B60R 21/38 |

OTHER PUBLICATIONS

CASE IH, AFS Connect Magnum, 2021, 15 pgs.
Buhler Versatile Inc., 2018, Versatile Photo Gallery, 2 pgs.
Case Construction, G Series Wheel Loaders, 2021, 16 pgs.

* cited by examiner

HOOD ASSEMBLY FOR A WORK VEHICLE

BACKGROUND

The present disclosure relates generally to a hood assembly for a work vehicle.

Certain work vehicles, such as tractors, harvesters, and sprayers, have a hood assembly including a hood configured to facilitate access to certain components of the work vehicle, such as the engine, the cooling system, components of the hydraulic system, etc. Due to the weight of the hood, the hood assembly may include one or more gas struts to offset a portion of the weight of the hood, thereby reducing operator effort in moving the hood from a closed position to an open position. The strut(s) may extend from a chassis of the work vehicle to the hood, and the strut(s) may urge the hood toward the open position. Unfortunately, during cold weather conditions, the force applied by the strut(s) may be reduced. As a result, the force sufficient to drive the hood from the closed position to the open position may be increased, thereby increasing operator effort in opening the hood. In addition, during warm weather conditions, the force applied by the strut(s) may be increased. As a result, the force sufficient to drive the hood from the open position to the closed position may be increased, thereby increasing operator effort in closing the hood.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In certain embodiments, a hood assembly for a work vehicle includes a hood and a hood pivot joint configured to pivotally couple the hood to a chassis of the work vehicle. The hood pivot joint is configured to enable the hood to rotate between an open position and a closed position. The hood assembly also includes a lift mechanism having a linkage assembly pivotally coupled to the hood and configured to pivotally couple to the chassis of the work vehicle. In addition, the lift mechanism includes a linear actuator coupled to the linkage assembly. The linear actuator is configured to drive the linkage assembly to rotate the hood between the open and closed positions.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
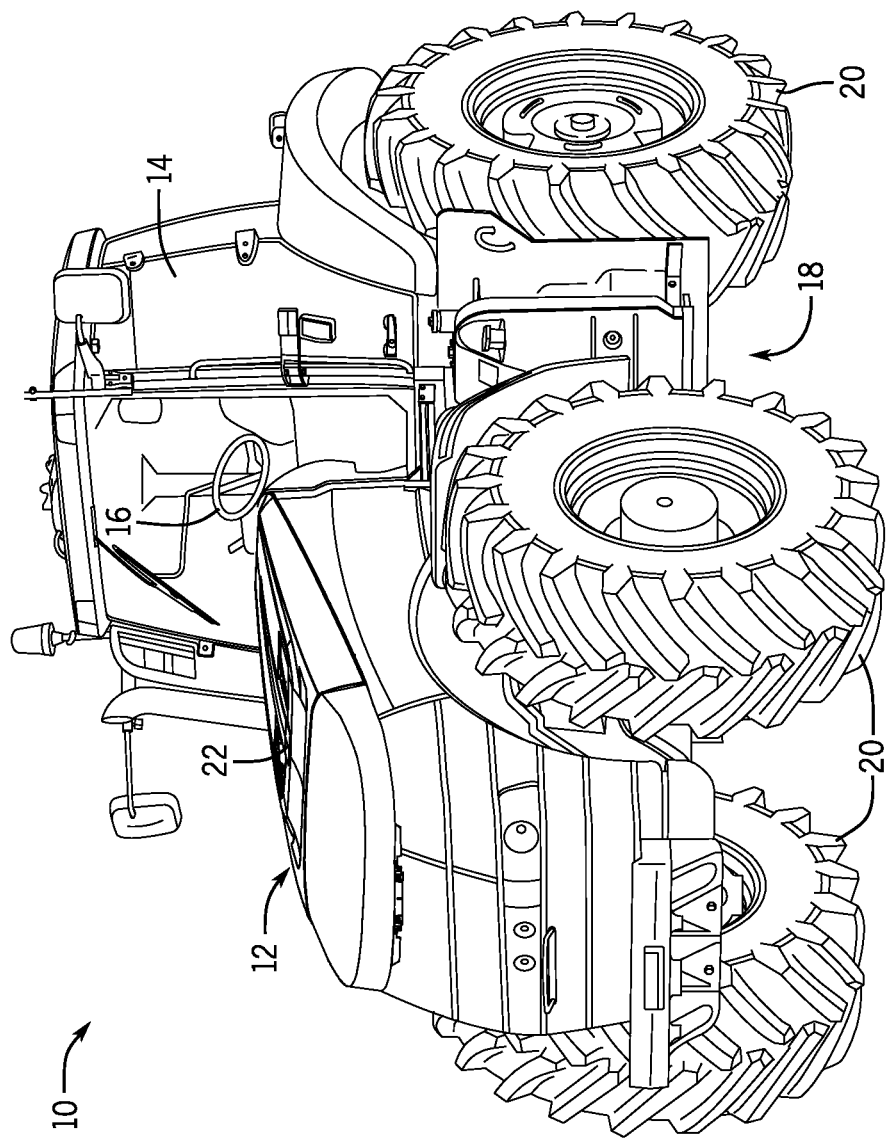
FIG. 1 is a perspective view of an embodiment of a work vehicle having an embodiment of a hood assembly.

FIG. 1 is a perspective view of an embodiment of a work vehicle 10 having an embodiment of a hood assembly 12. In the illustrated embodiment, the work vehicle 10 includes a cab 14 configured to house an operator. A steering wheel 16 is disposed within the cab 14 to facilitate control of the work vehicle 10. The cab 14 may also house additional controls to enable the operator to control various functions of the work vehicle (e.g., movement of a tool coupled to the work vehicle, speed of the work vehicle, etc.). In the illustrated embodiment, the work vehicle 10 includes a chassis 18 configured to support an engine, a transmission, the hood assembly 12, other systems of the work vehicle 10, or a combination thereof. In addition, the work vehicle 10 includes wheels 20 configured to be driven by the engine, thereby driving the work vehicle 10 through a field. While the work vehicle 10 includes wheels 20 in the illustrated embodiment, in other embodiments, the work vehicle may include tracks or a combination of wheels and tracks. Furthermore, while the work vehicle 10 is a tractor in the illustrated embodiment, in other embodiments, the work vehicle may be a harvester, a sprayer, a bulldozer, or any other suitable type of work vehicle.

As discussed in detail below, the hood assembly 12 includes a hood 22 and a hood pivot joint configured to pivotally couple the hood 22 to the chassis 18 of the work vehicle 10. The hood pivot joint is configured to enable the hood 22 to pivot between an open position and a closed position. Rotating the hood 22 to the open position facilitates access to certain component(s) of the work vehicle 10, such as the engine, a cooling system, component(s) of a hydraulic system, other suitable component(s), or a combination thereof. Furthermore, while the hood 22 is in the closed position, access to the component(s) is blocked, and the hood 22 may substantially reduce dirt and/or debris from collecting on the component(s). Furthermore, as discussed in detail below, the hood assembly 12 includes a lift mechanism having a linkage assembly and a linear actuator. The linkage assembly is pivotally coupled to the hood 22 and to the chassis 18 of the work vehicle 10. In addition, the linear actuator is coupled (e.g., pivotally coupled) to the linkage assembly, and the linear actuator is configured to drive the linkage assembly to rotate the hood between the open and closed positions. Because the linear actuator is configured to drive the hood to rotate between the open and closed positions, operator effort associated with manually moving the hood between the open and closed positions may be substantially reduced or eliminated, thereby facilitating the hood opening and closing processes.

Figure 2:
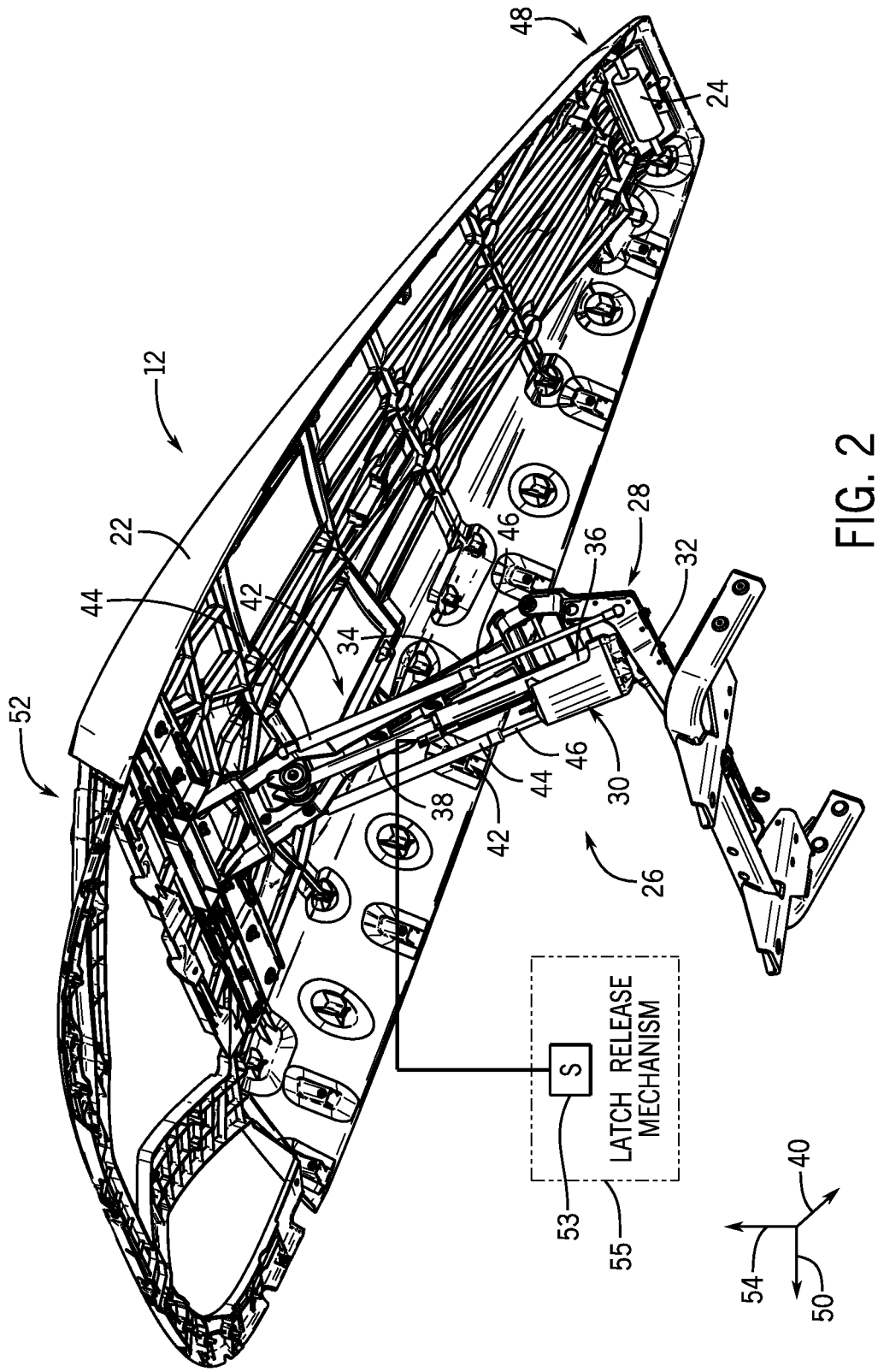
FIG. 2 is a perspective view of the hood assembly of FIG. 1, in which a hood of the hood assembly is in an open position.

FIG. 2 is a perspective view of the hood assembly 12 of FIG. 1, in which the hood 22 of the hood assembly 12 is in the open position. As previously discussed, the hood assembly 12 includes the hood 22 and a hood pivot joint 24. The hood pivot joint 24 is configured to pivotally couple the hood 22 to the chassis of the work vehicle, thereby enabling the hood 22 to rotate between the illustrated open position and the closed position. The hood assembly 12 also includes a lift mechanism 26 having a linkage assembly 28 and a linear actuator 30. The linkage assembly 28 is pivotally coupled to the hood 22 and to the chassis of the work vehicle. In addition, the linear actuator 30 is coupled (e.g., pivotally coupled) to the linkage assembly 28, and the linear actuator 30 is configured to drive the linkage assembly 28 to rotate the hood 22 between the open and closed positions. Because the linear actuator is configured to drive the hood to rotate between the open and closed positions, operator effort associated with manually moving the hood between the open and closed positions may be substantially reduced or eliminated, thereby facilitating the hood opening and closing processes. In addition, because the lift mechanism 26 drives the hood 22 to rotate between the open and closed positions, the opening angle of the hood 22 may not be limited by the reach of an operator, thereby facilitating a larger opening angle, which may enhance access to the component(s) under the hood 22.

In the illustrated embodiment, the linkage assembly 28 has a lower link 32 and an upper link 34. The lower link 32 is pivotally coupled to the chassis of the work vehicle, and the upper link 34 is pivotally coupled to the hood 22. In addition, the lower link 32 and the upper link 34 are pivotally coupled to one another. Furthermore, in the illustrated embodiment, the linear actuator 30 is pivotally coupled to the lower link 32 and to the upper link 34. Accordingly, extension of the linear actuator 30 drives the lower and upper links to rotate away from one another, thereby driving the hood 22 to rotate toward the illustrated open position. In addition, retraction of the linear actuator 30 drives the lower and upper links to pivot toward one another, thereby driving the hood 22 to rotate toward the closed position. Due to the coupling locations of the linear actuator 30, a relatively small extension or retraction of the linear actuator 30 drives the hood 22 to rotate through a relatively large angle, thereby enabling a large opening angle of the hood 22 with a relatively short/compact linear actuator 30.

While the linear actuator 30 is pivotally coupled to the lower link 32 and to the upper link 34 in the illustrated embodiment, in other embodiments, the linear actuator may be coupled to other suitable structure(s) to drive the hood to rotate between the open and closed positions. For example, in certain embodiments, the linear actuator may be pivotally coupled to the chassis of the work vehicle (e.g., directly or via a mount/mounting structure). Additionally or alternatively, in certain embodiments, the linear actuator may be pivotally coupled to the hood of the hood assembly (e.g., directly or via a mount/mounting structure). For example, in certain embodiments, the linear actuator may be pivotally coupled to the chassis and to the hood, the linear actuator may be pivotally coupled to the lower link and to the hood, or the linear actuator may be pivotally coupled to the chassis and to the upper link. Furthermore, while the lift mechanism 26 includes a single linear actuator 30 in the illustrated embodiment, in other embodiments, the lift mechanism may include multiple linear actuators (e.g., 2, 3, 4, or more), and each linear actuator may be pivotally coupled to any of the structures disclosed above and/or to any other suitable structure(s). In addition, in certain embodiments, the linear actuator may be omitted.

In the illustrated embodiment, the linear actuator 30 is an electric linear actuator having a body 36 and an actuating rod 38. The body 36 is configured to house a driver, such as an electric motor, and the driver is configured to drive the actuating rod 38 to move relative to the body 36, thereby driving the linear actuator 30 to extend and retract. In the illustrated embodiment, the body 36 of the linear actuator 30 is pivotally coupled to the lower link 32, and the actuating rod 38 is pivotally coupled to the upper link 34. However, in other embodiments, the body of the linear actuator may be pivotally coupled to the upper link or to another suitable structure, and the actuating rod may be pivotally coupled to the lower link or to another suitable structure. While the linear actuator is an electric linear actuator in the illustrated embodiment, in other embodiments, the linear actuator may be a pneumatic linear actuator (e.g., pneumatic cylinder, air bag, etc.), a hydraulic linear actuator (e.g., hydraulic cylinder, etc.), or another suitable type of linear actuator. Furthermore, while the lift mechanism includes a linear actuator in the illustrated embodiment, in other embodiments, the lift mechanism may include a rotary actuator (e.g., electric motor, pneumatic motor, hydraulic motor, etc.) coupled to the upper and lower links and configured to drive the upper and lower links to rotate relative to one another.

In the illustrated embodiment, each link of the linkage assembly 28 is substantially rigid. Each link may be formed from any suitable material to establish the substantially rigid link, such as steel, aluminum, polymeric material, composite material (e.g., fiberglass, carbon fiber, fiber reinforced plastic, etc.), other suitable material(s), or a combination thereof. Furthermore, while the linkage assembly 28 includes two links (e.g., only two links) in the illustrated embodiment, in other embodiments, the linkage assembly may include one or more additional links. For example, in certain embodiments, the linkage assembly may include 3, 4, 5, 6, or more links, and the links may be pivotally coupled to one another.

In the illustrated embodiment, the lower link 32 is configured to rotate about an axis substantially parallel to a lateral axis 40 of the hood assembly 12 relative to the chassis of the work vehicle. In addition, the upper link 34 is configured to rotate about an axis substantially parallel to the lateral axis 40 relative to the hood 22. Furthermore, the lower link 32 and the upper link 34 are configured to rotate about an axis substantially parallel to the lateral axis 40 relative to one another. However, in other embodiments, the links may be configured to rotate about other suitable axes. For example, in certain embodiments, the links may be configured to rotate about respective axes substantially parallel to a longitudinal axis of the hood assembly, or the links may be configured to rotate about respective axes substantially parallel to an axis angled relative to the lateral axis and/or the longitudinal axis of the hood assembly.

In the illustrated embodiment, the lift mechanism 26 includes two struts 42 configured to urge the hood 22 toward the open position, thereby reducing the load on the linear actuator 30. Accordingly, a smaller/less powerful linear actuator 30 may be used to drive the hood 22 to rotate between the open and closed positions, thereby reducing the cost of the lift mechanism 26. In certain embodiments, each strut 42 is a gas strut (e.g., pneumatic strut). However, in other embodiments, at least one strut may be a hydraulic strut, a mechanical strut (e.g., including a spring), or another suitable type of strut. In the illustrated embodiment, the struts 42 are positioned on opposite lateral sides of the lower and upper links (e.g., opposite sides along the lateral axis 40). However, in other embodiments, the struts may be positioned on the same lateral side of the lower and upper links, or at least one strut may be positioned between the lower and upper links along the lateral axis. Furthermore, while the lift mechanism 26 includes two struts 42 in the illustrated embodiment, in other embodiments, the lift mechanism may include more or fewer struts (e.g., 0, 1, 3, 4, 5, 6, or more), and the struts may be positioned in any suitable location(s). For example, in certain embodiments, the struts may be omitted. Furthermore, in certain embodiments, the lift mechanism may include other suitable biasing element(s) (e.g., alone or in combination with the strut(s)) configured to urge the hood toward the open position, such as coil spring(s) positioned at the hood pivot joint.

In the illustrated embodiment, each strut 42 is pivotally coupled to the lower link 32 and to the upper link 34. Accordingly, the struts 42 urge the lower and upper links to rotate away from one another, thereby urging the hood 22 to rotate toward the illustrated open position. Furthermore, in the illustrated embodiment, each strut 42 includes a body 44 and an actuating rod 46 extending from the body 44. The actuating rod 46 is urged way from the body 44 (e.g., due to air pressure, hydraulic pressure, etc.), thereby urging the strut 42 to extend. In the illustrated embodiment, the body 44 of each strut 42 is pivotally coupled to the upper link 34, and the actuating rod 46 of each strut 42 is pivotally coupled to the lower link 32. However, in other embodiments, the body of at least one strut may be pivotally coupled to the lower link, and the corresponding actuating rod(s) may be pivotally coupled to the upper link. Furthermore, in certain embodiments, at least one strut may not include a body and/or an actuating rod, such as a mechanical strut (e.g., including a spring).

While each strut 42 is pivotally coupled to the lower link 32 and to the upper link 34 in the illustrated embodiment, in other embodiments, at least one strut may be coupled to other suitable structure(s) to urge the hood to rotate toward the open position. For example, in certain embodiments, at least one strut may be pivotally coupled to the chassis of the work vehicle (e.g., directly or via a mount/mounting structure). Additionally or alternatively, in certain embodiments, at least one strut may be pivotally coupled to the hood of the hood assembly (e.g., directly or via a mount/mounting structure). For example, in certain embodiments, at least one strut may be pivotally coupled to the chassis and to the hood, at least one strut may be pivotally coupled to the lower link and to the hood, at least one strut may be pivotally coupled to the chassis and to the upper link, or a combination thereof.

In the illustrated embodiment, the hood pivot joint 24 is positioned at a rear portion 48 of the hood 22 relative to a longitudinal axis 50 of the hood assembly 12. In addition, the linkage assembly 28 (e.g., the upper link 34 of the linkage assembly 28) is pivotally coupled to the hood 22 at a front portion 52 of the hood 22 relative to the longitudinal axis 50. Accordingly, the lift mechanism 26 is configured to drive the front portion 52 of the hood 22 upwardly relative to a vertical axis 54 of the hood assembly 12 to rotate the hood 22 to the open position, and the lift mechanism 26 is configured to drive the front portion 52 of the hood 22 downwardly relative to the vertical axis 54 to rotate the hood 22 to the closed position. Because the hood pivot joint 24 is positioned at a rear portion 48 of the hood 22 and the linkage assembly 28 is pivotally coupled to the front portion 52 of the hood 22, the longitudinal stability of the hood 22 may be enhanced (e.g., as compared to a hood assembly in which the pivot joint is positioned at the rear portion of the hood and the linkage assembly is pivotally coupled to the rear portion of the hood). While the hood pivot joint 24 is positioned at the rear portion 48 of the hood 22 and the linkage assembly 28 is pivotally coupled to the front portion 52 of the hood 22 in the illustrated embodiment, in other embodiments, the hood pivot joint may be positioned at another suitable portion of the hood and the linkage assembly may be pivotally coupled to another suitable portion of the hood. For example, in certain embodiments, the hood pivot joint may be positioned at the front portion of the hood, and the linkage assembly may be pivotally coupled to the rear portion of the hood. Furthermore, in certain embodiments, the hood pivot joint may be positioned at the rear portion of the hood, and the linkage assembly may be pivotally coupled to the rear portion of the hood. In addition, in certain embodiments, the hood pivot joint may be positioned at the front portion of the hood, and the linkage assembly may be pivotally coupled to the front portion of the hood. With regard to the front and rear portions of the hood, the front portion is positioned forward of a longitudinal center of the hood (e.g., center of the hood along the longitudinal axis while the hood is in the closed position), and the rear portion is positioned rearward of the longitudinal center of the hood (e.g., center of the hood along the longitudinal axis while the hood is in the closed position).

Furthermore, in the illustrated embodiment, the lift mechanism 26 includes a switch 53 communicatively coupled to the linear actuator 30 (e.g., electric linear actuator). The switch 53 is configured to control the linear actuator 30 to move the hood 22 from the illustrated open position to the closed position and to move the hood 22 from the closed position to the illustrated open position based on operator input. The switch 53 may be located at or near the hood 22 on an exterior of the work vehicle, or the switch 53 may be located within the cab of the work vehicle. Furthermore, in certain embodiments, the switch 53 may be integrated with a latch release mechanism 55, which is configured to release latch(es) that secure the hood 22 in the closed position. For example, a handle of the latch release mechanism 55 may be located within the cab of the work vehicle, and the operator may activate the latch release mechanism 55 using the handle to disengage the latch(es) and control the linear actuator 30 to move the hood from the closed position to the open position. In addition, the operator may use the handle to activate the latch release mechanism 55 to control the linear actuator 30 to move the hood from the open position to the closed position.

Figure 3:
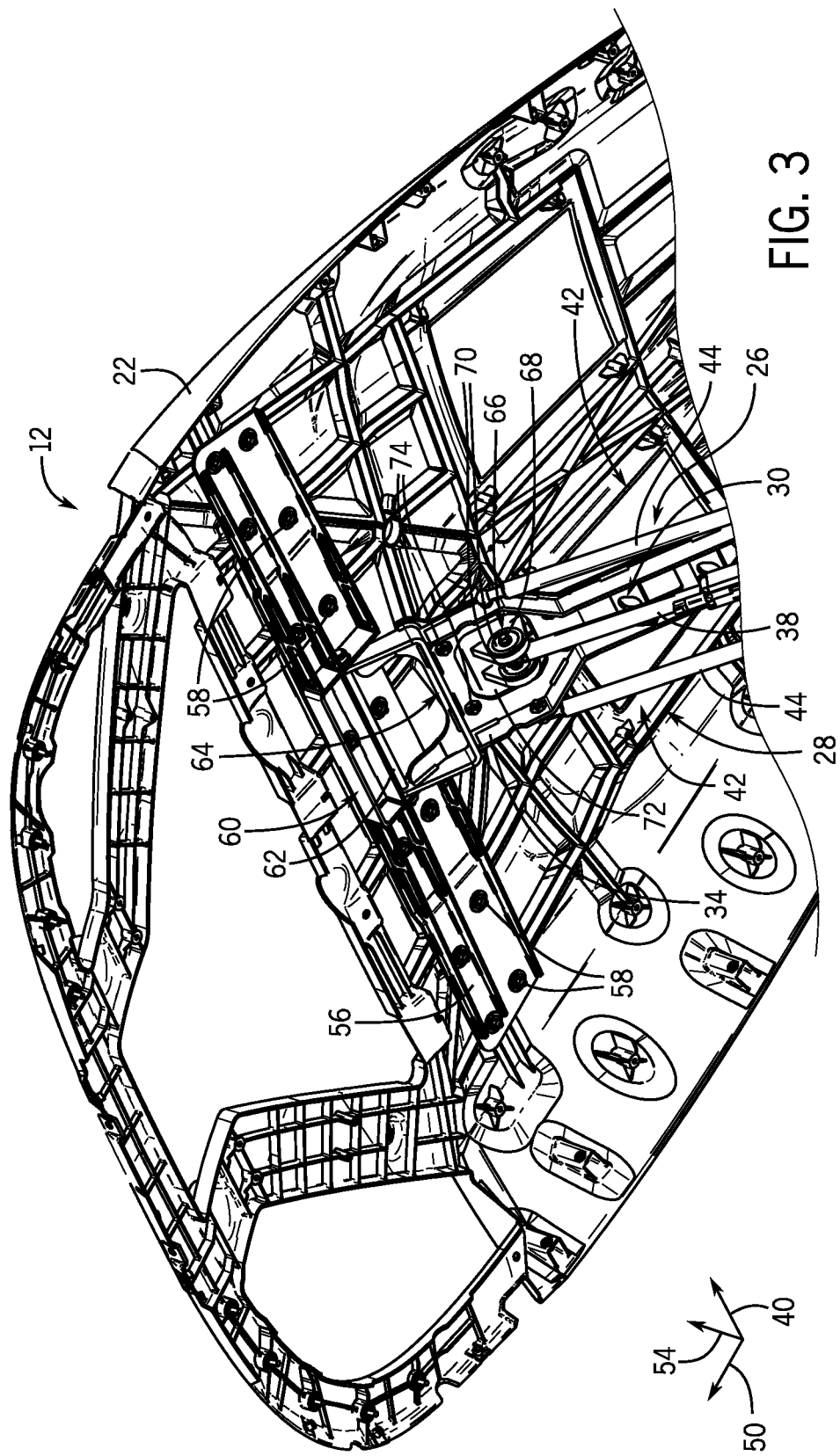
FIG. 3 is a perspective view of a portion of the hood assembly of FIG. 1.

FIG. 3 is a perspective view of a portion of the hood assembly 12 of FIG. 1. In the illustrated embodiment, the hood assembly 12 includes a support structure 56 coupled to the hood 22 and pivotally coupled to the upper link 34 of the linkage assembly 28. Accordingly, the upper link 34 is pivotally coupled to the hood 22 via the support structure 56. The support structure 56 is configured to enhance the lateral stability of the hood 22 (e.g., stability of the hood 22 along the lateral axis 40), thereby reducing rotation/wobble of the hood 22 (e.g., generally about the longitudinal axis 50) while the hood 22 is in the illustrated open position. In addition, the support structure 56 is configured to distribute the load applied by the lift mechanism 26 to the hood 22 over a larger area of the hood 22, thereby reducing stress within the hood 22. In the illustrated embodiment, the support structure 56 is coupled to the hood 22 by a fastener connection, which includes fastener(s) 58. However, in other embodiments, the support structure may be coupled to the hood by other suitable types of connection(s) (e.g., alone or in combination with the fastener connection), such as an adhesive connection, a welded connection, other suitable type(s) of connection(s), or a combination thereof.

As illustrated, the upper link 34 is pivotally coupled to the support structure 56 by an upper link pivot joint 60. In the illustrated embodiment, the upper link pivot joint 60 includes a pin 62 that extends through openings in the upper link 34 and the support structure 56. The pin 62 may be secured by any suitable type(s) of fastener(s), such as cotter pin(s), nut(s), clip(s), etc. Furthermore, in certain embodiments, one or more bushings and/or one or more bearings may be disposed about the pin to facilitate rotation of the upper link relative to the support structure. While the upper link pivot joint 60 includes the pin 62 in the illustrated embodiment, in other embodiments, the upper link pivot joint may include any other suitable element(s) (e.g., alone or in combination with the pin) to establish the pivotal connection between the upper link and the support structure. Furthermore, while the hood assembly 12 includes the support structure 56 in the illustrated embodiment, in other embodiments, the support structure may be omitted. In such embodiments, the upper link may be directly pivotally coupled to the hood, or the upper link may be pivotally coupled to the hood via other suitable structure(s).

In the illustrated embodiment, the lift mechanism 26 includes a pivot assembly 64 that forms a linear actuator pivot joint 66 (e.g., first linear actuator pivot joint, linear actuator/upper link pivot joint) between the linear actuator 30 (e.g., the actuating rod 38 of the linear actuator 30) and the upper link 34. The pivot assembly 64 pivotally couples the linear actuator 30 (e.g., the actuating rod 38 of the linear actuator 30) to the upper link 34, such that the linear actuator 30 (e.g., the actuating rod 38 of the linear actuator 30) is pivotally coupled to the upper link 34 at the linear actuator pivot joint 66. In the illustrated embodiment, the pivot assembly 64 includes a pin 68 that extends through openings in the linear actuator 30 (e.g., the actuating rod 38 of the linear actuator 30) and the pivot assembly 64. The pin 68 may be secured by any suitable type(s) of fastener(s), such as cotter pin(s), nut(s), clip(s), etc. While the pivot assembly 64 includes the pin 68 in the illustrated embodiment, in other embodiments, the pivot assembly may include any other suitable element(s) (e.g., alone or in combination with the pin) to establish the pivotal connection between the upper link and the linear actuator.

Furthermore, in the illustrated embodiment, the pivot assembly 64 includes resilient bushings 70 configured to facilitate movement of an end of the linear actuator 30 relative to the upper link 34, thereby enabling the linear actuator 30 to fully retract while the hood is in the closed position. For example, the linear actuator 30 may be controlled to fully retract to rotate the hood from the open position to the closed position. Once the hood is closed, further rotation of the upper and lower links is blocked. However, the linear actuator may not be fully retracted (e.g., due to tolerance stacking of components, thermal expansion/ contraction of component(s), etc.). Accordingly, the resilient bushings 70 enable the linear actuator to fully retract while the hood is in the closed position. In the illustrated embodiment, the resilient bushings 70 are disposed between the pin 68 and a support structure 72 of the pivot assembly 64. While the pivot assembly 64 includes two resilient bushings 70 in the illustrated embodiment, in other embodiments, the pivot assembly may include more or fewer resilient bushings (e.g., based on the configuration of the pivot assembly). Furthermore, in embodiments of the pivot assembly in which the pin is omitted, the resilient bushing(s) may be disposed about the other suitable element(s) configured to establish the pivotal connection between the upper link and the linear actuator. Furthermore, in certain embodiments, the resilient bushing(s) may be omitted, and/or the pivot assembly may include bearing(s).

In the illustrated embodiment, the support structure 72 of the pivot assembly 64 is coupled to the upper link 34 by a fastener connection, which includes fastener(s) 74. However, in other embodiments, the support structure of the pivot assembly may be coupled to the upper link by other suitable types of connection(s) (e.g., alone or in combination with the fastener connection), such as an adhesive connection, a welded connection, other suitable type(s) of connection(s), or a combination thereof. Furthermore, in certain embodiments, the support structure of the pivot assembly may be integrally formed with the upper link.

Figure 4:
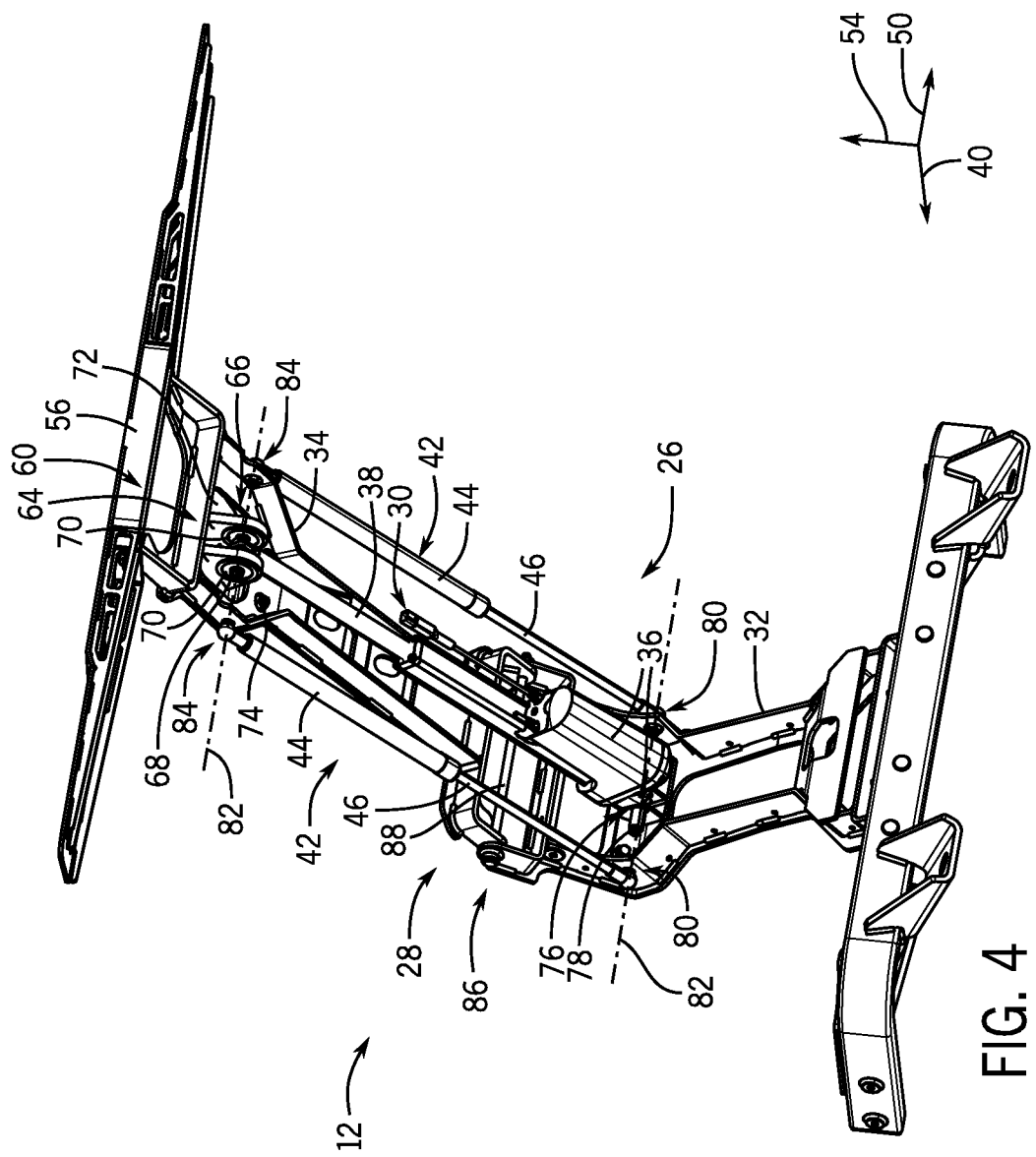
FIG. 4 is another perspective view of a portion of the hood assembly of FIG. 1.

FIG. 4 is another perspective view of a portion of the hood assembly 12 of FIG. 1. As illustrated, the linear actuator 30 (e.g., the body 36 of the linear actuator 30) is pivotally coupled to the lower link 32 at a linear actuator pivot joint 76 (e.g., second linear actuator pivot joint, linear actuator/ lower link pivot joint). In the illustrated embodiment, the linear actuator pivot joint 76 includes a releasable pin 78 that extends through openings in the lower link 32 and the linear actuator 30 (e.g., the body 36 of the linear actuator 30). The releasable pin 78 may be secured by any suitable type(s) of fastener(s), such as cotter pin(s), nut(s), clip(s), etc. For example, one end of the releasable pin may include a head, and the other end of the releasable pin may include a feature (e.g., groove, threads, aperture, etc.) configured to receive a fastener. To remove the releasable pin, the fastener may be disengaged from the releasable pin, and the releasable pin may be extracted from the openings in the lower link and the linear actuator, thereby releasing the linear actuator from the lower link. As a result, the hood may be manually rotated from the closed position to the open position. As discussed in detail below, the hood includes opening(s) configured to facilitate access to the releasable pin while the hood is in the closed position. Accordingly, while the hood is in the closed position and the linear actuator is non-operational (e.g., due to interruption of electrical power to the electric linear actuator), the releasable pin may be removed, and the hood may be manually rotated to the open position (e.g., with the assistance of the strut(s)). In certain embodiments, one or more bushing and/or one or more bearings may be disposed about the releasable pin to facilitate rotation of the linear actuator relative to the lower link. Furthermore, the opening(s) in the lower link 32 that receive the releasable pin 78 are formed within a mounting portion of the lower link 32. The mounting portion may be integrally formed with a body of the lower link, or the mounting portion may be coupled to the body of the lower link (e.g., by a fastener connection, by a welded connection, by an adhesive connection, etc.). While the linear actuator pivot joint 76 includes the releasable pin 78 in the illustrated embodiment, in other embodiments, the linear actuator pivot joint may include any other suitable element(s) (e.g., alone or in combination with the releasable pin) to establish the pivotal connection between the linear actuator and the lower link.

In the illustrated embodiment, each strut 42 (e.g., the actuating rod 46 of each strut 42) is pivotally coupled to the lower link 32 at a respective strut pivot joint 80. Each strut pivot joint 80 may include any suitable component(s) configured to facilitate rotation of the respective strut 42 relative to the lower link 32 (e.g., including a ball joint). In addition, as previously discussed, the linear actuator 30 (e.g., the body 36 of the linear actuator 30) is pivotally coupled to the lower link 32 at the linear actuator pivot joint 76. In the illustrated embodiment, the strut pivot joints 80 and the linear actuator pivot joint 76 are substantially coaxial. As used herein with regard to pivot joints, "substantially coaxial" refers to pivot joints having pivot axes 82 that are substantially aligned with one another. Furthermore, as used herein with regard to pivot axes, "substantially aligned" refers to an angular variation between pivot axes less than a threshold angle and a offset distance between pivot axes less than a threshold offset distance. In certain embodiments, the threshold angle may be 5 degrees, 4 degrees, 3 degrees, 2 degrees, 1 degree, 0.5 degrees, or 0.1 degrees. Furthermore, in certain embodiments, the threshold offset distance may be 15 mm, 10 mm, 5 mm, 1 mm, 0.5 mm, or 0.1 mm.

Furthermore, in the illustrated embodiment, each strut 42 (e.g., the body 44 of each strut 42) is pivotally coupled to the upper link 34 at a respective strut pivot joint 84. Each strut pivot joint 84 may include any suitable component(s) configured to facilitate rotation of the respective strut 42 relative to the upper link 34 (e.g., including a ball joint). In addition, as previously discussed, the linear actuator 30 (e.g., the actuating rod 38 of the linear actuator 30) is pivotally coupled to the upper link 34 at the first linear actuator pivot joint 66. In the illustrated embodiment, the strut pivot joints 84 and the first linear actuator pivot joint 66 are substantially coaxial. While the strut pivot joints 80 and the second linear actuator pivot joint 76 are coaxial in the illustrated embodiment, in other embodiments, at least one pivot joint may be angularly and/or translationally offset from at least one other pivot joint. For example, the linear actuator may be pivotally coupled to the lower link, and at least one strut may be pivotally coupled to the chassis of the work vehicle. Furthermore, while the strut pivot joints 84 and the first linear actuator pivot joint 66 are substantially coaxial in the illustrated embodiment, in other embodiments, at least one pivot joint may be angularly and/or translationally offset from at least one other pivot joint. For example, the linear actuator may be pivotally coupled to the upper link, and at least one strut may be pivotally coupled to the hood.

As illustrated, the upper link 34 is pivotally coupled to the lower link 32 by a link interconnection pivot joint 86. In the illustrated embodiment, the link interconnection pivot joint 86 includes a pin 88 that extends through openings in the upper link 34 and the lower link 32. The pin 88 may be secured by any suitable type(s) of fastener(s), such as cotter pin(s), nut(s), clip(s), etc. Furthermore, in certain embodiments, one or more bushings and/or one or more bearings may be disposed about the pin to facilitate rotation of the upper link relative to the lower link. While the link interconnection pivot joint 86 includes the pin 88 in the illustrated embodiment, in other embodiments, the link interconnection pivot joint may include any other suitable element(s) (e.g., alone or in combination with the pin) to establish the pivotal connection between the upper link and the lower link. Furthermore, because the second linear actuator pivot joint 76 is positioned proximate to the link interconnection pivot joint 86 relative to the longitudinal axis 50, a relatively small extension or retraction of the linear actuator 30 drives the hood to rotate through a relatively large angle, thereby enabling a large opening angle of the hood with a relatively short/compact linear actuator 30. However, in other embodiments, each linear actuator pivot joint may be positioned at any suitable location (e.g., relative to the longitudinal axis) relative to the link interconnection pivot joint.

Figure 5:
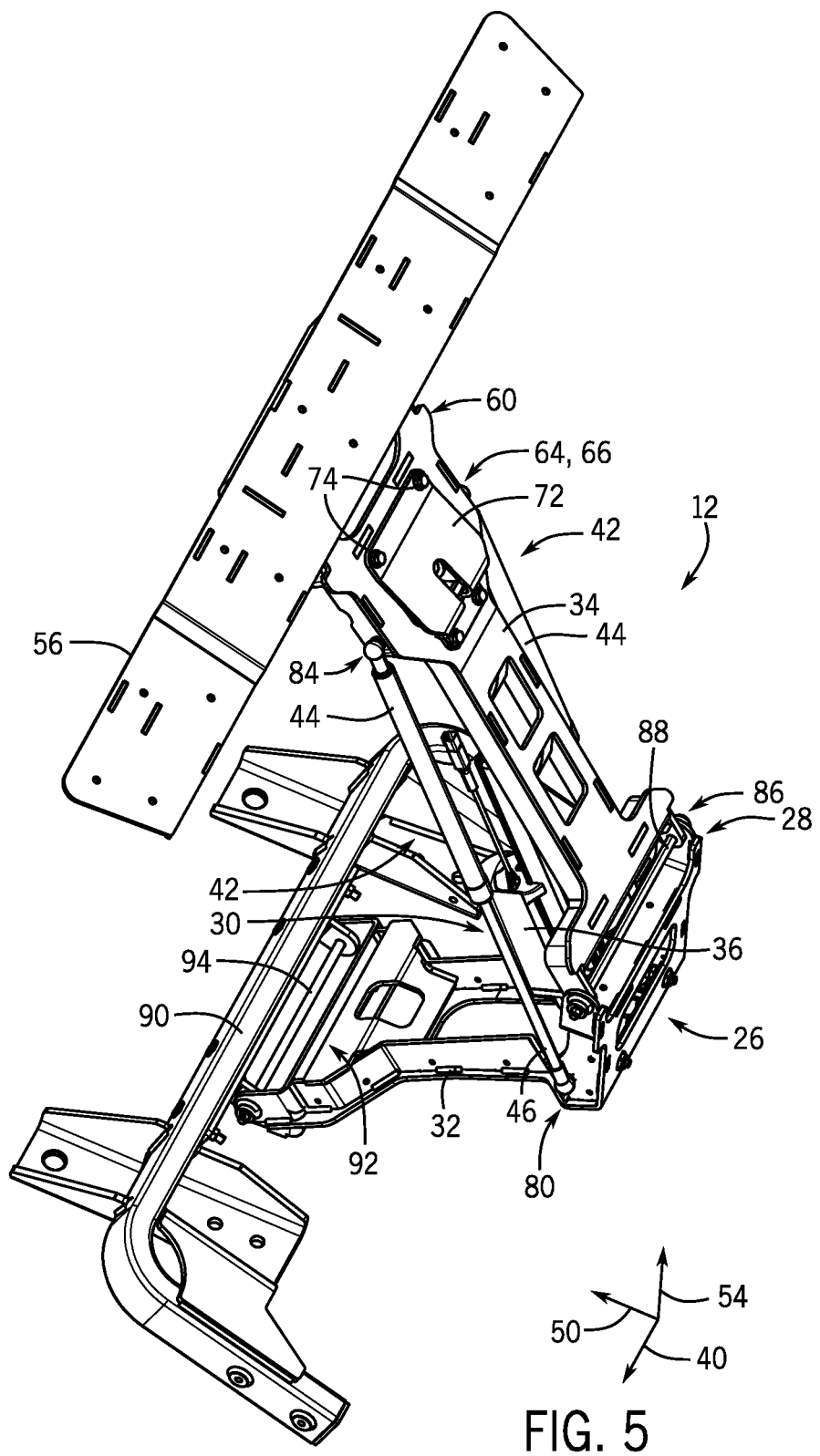
FIG. 5 is a further perspective view of a portion of the hood assembly of FIG. 1.

FIG. 5 is a further perspective view of a portion of the hood assembly 12 of FIG. 1. In the illustrated embodiment, the hood assembly 12 includes a mount 90 coupled to the chassis of the work vehicle and pivotally coupled to the lower link 32 of the linkage assembly 28. Accordingly, the lower link 32 is pivotally coupled to the chassis of the work vehicle via the mount 90. The mount 90 is configured to distribute the load applied by the lift mechanism 26 to the work vehicle chassis over a larger area of the work vehicle chassis, thereby reducing stress within the work vehicle chassis. In the illustrated embodiment, the mount 90 is coupled to the work vehicle chassis by a fastener connection, which includes fastener(s). However, in other embodiments, the mount may be coupled to the work vehicle chassis by other suitable types of connection(s) (e.g., alone or in combination with the fastener connection), such as an adhesive connection, a welded connection, other suitable type(s) of connection(s), or a combination thereof.

As illustrated, the lower link 32 is pivotally coupled to the mount 90 by a lower link pivot joint 92. In the illustrated embodiment, the lower link pivot joint 92 includes a pin 94 that extends through openings in the lower link 32 and the mount 90. The pin 94 may be secured by any suitable type(s) of fastener(s), such as cotter pin(s), nut(s), clip(s), etc. Furthermore, in certain embodiments, one or more bushings and/or one or more bearings may be disposed about the pin to facilitate rotation of the lower link relative to the mount. While the lower link pivot joint 92 includes the pin 94 in the illustrated embodiment, in other embodiments, the lower link pivot joint may include any other suitable element(s) (e.g., alone or in combination with the pin) to establish the pivotal connection between the lower link and the mount. Furthermore, while the hood assembly 12 includes the mount 90 in the illustrated embodiment, in other embodiments, the mount may be omitted. In such embodiments, the lower link may be directly pivotally coupled to the work vehicle chassis, or the lower link may be pivotally coupled to the work vehicle chassis via other suitable structure(s).

Figure 6:
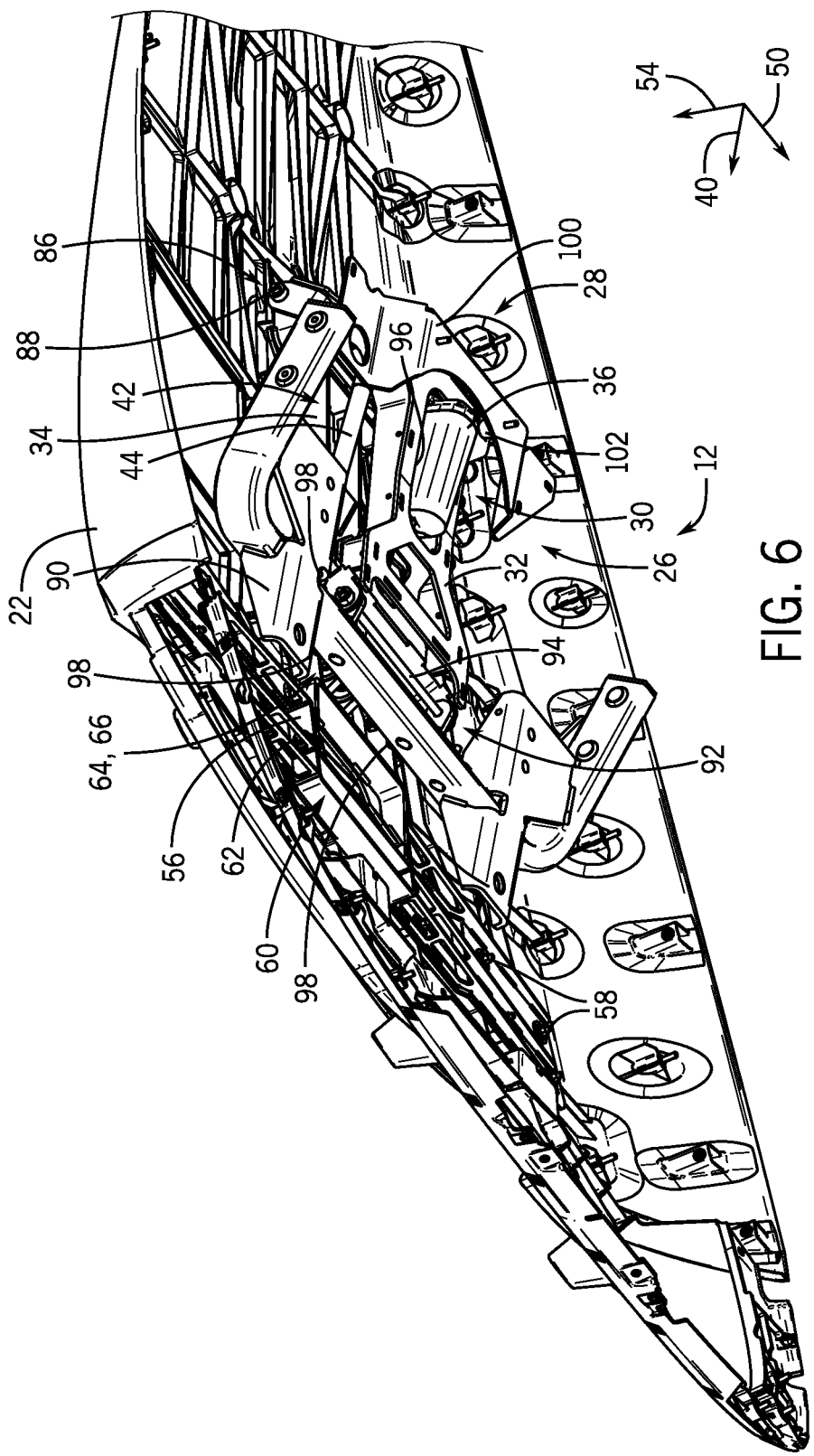
FIG. 6 is a perspective view of a portion of the hood assembly of FIG. 1, in which the hood of the hood assembly is in a closed position.

FIG. 6 is a perspective view of a portion of the hood assembly 12 of FIG. 1, in which the hood 22 of the hood assembly 12 is in the closed position. As illustrated, with the hood 22 in the closed position, the linkage assembly 28 is folded to a relatively small height relative to the vertical axis 54 (e.g., as compared to the linkage assembly 28 while the hood 22 is in the open position), thereby reducing the space utilized by the linkage assembly 28 under the hood 22. Furthermore, in the illustrated embodiment, the lower link 32 has an opening 96 configured to receive a portion of the linear actuator 30 (e.g., a portion of the body 36 of the linear actuator 30) while the hood 22 is in the illustrated closed position. As a result, the height of the lift mechanism 26 relative to the vertical axis 54 may be reduced. However, in other embodiments, the opening in the lower link may be omitted, and the linear actuator may be positioned above the lower link while the hood is in the closed position. In addition, in the illustrated embodiment, the upper link 34 has recess(es) 98 configured to receive the mount 90 while the hood 22 is in the illustrated closed position. As a result, the height of the lift mechanism 26 relative to the vertical axis 54 may be reduced. However, in other embodiments, the recess(es) in the upper link may be omitted, and/or the mount may have recess(es) configured to receive the upper link.

In the illustrated embodiment, the hood assembly 12 includes a base structure 100 coupled to the work vehicle chassis and configured to support a portion of the linkage assembly 28 while the hood 22 is in the closed position. The base structure 100 is coupled to the chassis of the work vehicle by a fastener connection, which includes fastener(s), in the illustrated embodiment. However, in other embodiments, the base structure may be coupled to the work vehicle chassis by any other suitable type(s) of connection(s) (e.g., alone or in combination with the fastener connection), such as a welded connection, an adhesive connection, other suitable type(s) of connection(s), or a combination thereof. Furthermore, in the illustrated embodiment, the hood assembly 12 includes stop(s) 102 coupled to the base structure 100. The stop(s) 102 are configured to engage the lower link 32 while the hood 22 is in the illustrated closed position, thereby supporting a portion of the linkage assembly 28. As a result, movement of the hood 22 past the closed position (e.g., movement of the hood beyond the closed position along a direction from the open position toward the closed position) may be blocked. In certain embodiments, the stop(s) 102 may be formed from a resilient material, such as rubber and/or a polymeric material, to dissipate the energy associated with contact between the lower link 32 and the stop(s) 102.

In certain embodiments, each stop 102 includes a magnet configured to magnetically engage the lower link 32 (e.g., metal structure of the lower link, magnet(s) coupled to the lower link, etc.), thereby coupling the lower link 32 to the base structure 100. As a result, the hood 22 may be secured in the closed position, thereby substantially reducing or eliminating unintentional opening of the hood 22 (e.g., opening of the hood without use of the linear actuator 30) during operation of the work vehicle. In certain embodiments, the hood 22 may be secured in the closed position by other suitable device(s) (e.g., alone or in combination with the magnet(s)), such as the linear actuator 30, one or more latches (e.g., releasable by the latch release mechanism), other suitable device(s), or a combination thereof. For example, in certain embodiments, the magnet(s) of the stop(s) may be omitted. In addition, in certain embodiments, the stop(s) may be omitted, and/or movement of the hood past the closed position (e.g., movement of the hood beyond the closed position along a direction from the open position toward the closed position) may be blocked by other suitable structure(s).

Figure 7:
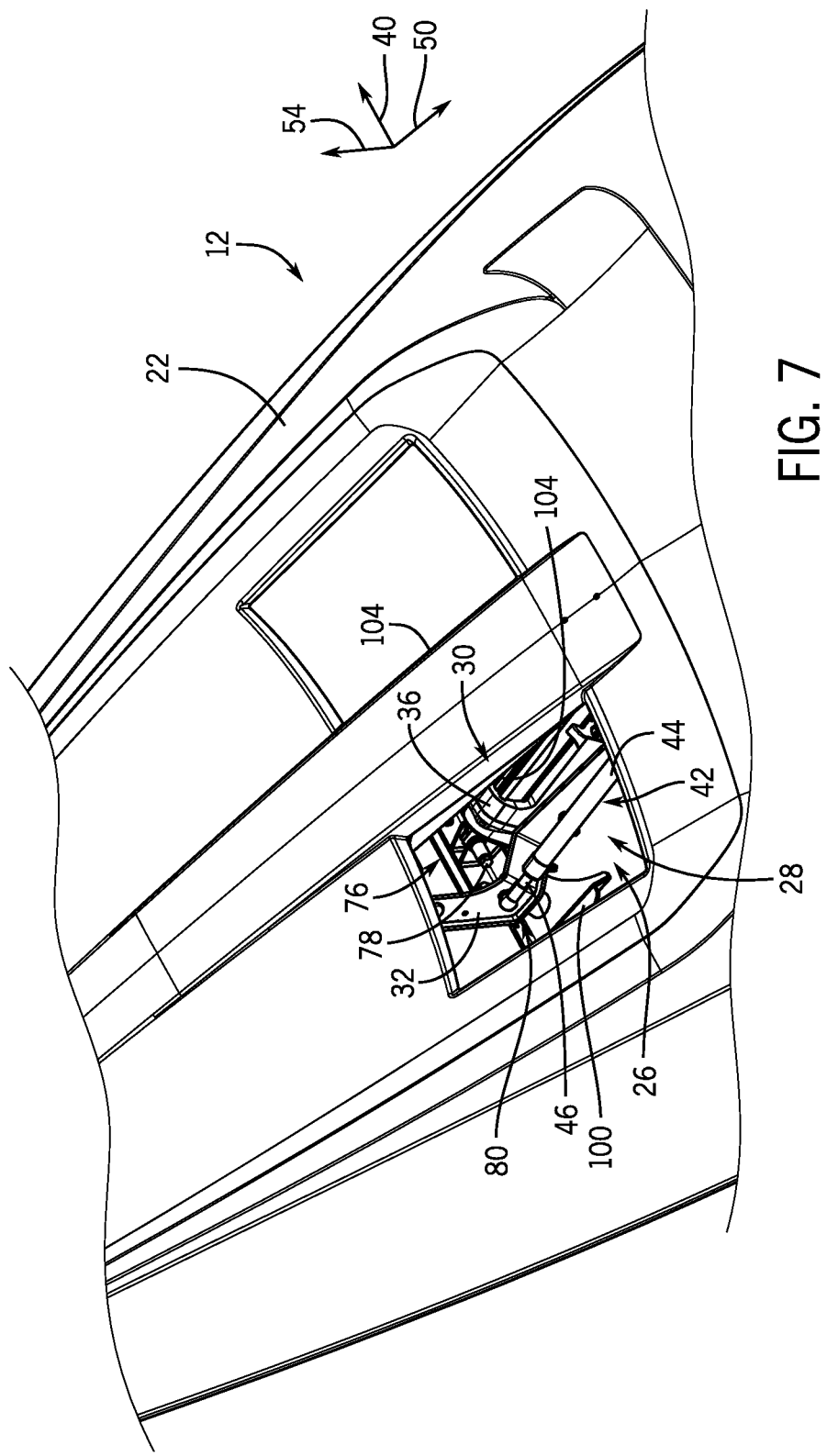
FIG. 7 is another perspective view of a portion of the hood assembly of FIG. 1.

FIG. 7 is another perspective view of a portion of the hood assembly 12 of FIG. 1. As previously discussed, the linear actuator 30 (e.g., the body 36 of the linear actuator 30) is pivotally coupled to the lower link 32 at the linear actuator pivot joint 76. In addition, the releasable pin 78 of the linear actuator pivot joint 76 extends through openings in the lower link 32 and the linear actuator 30 (e.g., the body 36 of the linear actuator 30). Furthermore, in the illustrated embodiment, the hood 22 includes two openings 104 configured to facilitate access to the releasable pin 78 while the hood 22 is in the illustrated closed position. While the hood 22 includes two openings 104 in the illustrated embodiment, in other embodiments, the hood may include more or fewer openings (e.g., 1, 3, 4, or more). Furthermore, in certain embodiments, an access panel may be disposed over each opening to block dirt and/or debris from passing through the hood while the access panel is engaged with the hood (e.g., closed). In addition, each access panel may be removable/openable to facilitate access to the releasable pin.

In certain embodiments, at least one access panel includes a lip positioned at a first end of the access panel and configured to engage a corresponding slot in the hood. In such embodiments, the lip may be engaged with the slot, and one or more fasteners may couple a second end of the access panel to the hood. Accordingly, to remove the access panel from the hood, the fasteners may be disengaged, and the lip may be removed from the slot (e.g., by sliding the access panel away from the slot). Furthermore, in certain embodiments, at least one access panel may be selectively coupled to the hood by any other suitable type(s) of releasable connection(s) (e.g., alone or in combination with the fastener(s) and/or the lip/slot connection), such as latch(es), magnet(s), other suitable type(s) of releasable connection(s), or a combination thereof. In addition, in certain embodiments, at least one access panel may be configured to rotate and/or translate between open and closed positions to selectively facilitate access to the releasable pin. In such embodiments, while the access panel is closed, one or more releasable connections (e.g., magnet(s), latch(es), etc.) may secure the access panel in the closed position. In addition, in certain embodiments, at least one access panel may be solid to block dirt and/or debris from passing through the hood while the access panel is engaged with the hood. Additionally or alternatively, at least one access panel may include aperture(s) to enable air to flow through the hood. Furthermore, in certain embodiments, at least one access panel may be omitted, and the respective opening(s) in the hood may remain open during operation of the work vehicle.

To remove the releasable pin, the access panel(s), if present, may be removed/opened. A fastener may then be disengaged from the releasable pin, and the releasable pin may be extracted from the openings in the lower link and the linear actuator, thereby releasing the linear actuator from the lower link. As a result, the hood may be manually rotated from the closed position to the open position. Accordingly, while the hood is in the illustrated closed position and the linear actuator is non-operational (e.g., due to interruption of electrical power to the electric linear actuator), the releasable pin may be removed, and the hood may be manually rotated to the open position (e.g., with the assistance of the strut(s)). While the releasable pin is used to selectively disconnect an end of the linear actuator in the illustrated embodiment, in other embodiments, other suitable device(s)/element(s) may be used to disconnect an end of the linear actuator to enable the hood to be manually rotated to the open position. For example, in embodiments in which the mounting portion of the lower link is coupled to the body of the lower link, an end of the linear actuator may be disconnected by uncoupling the mounting portion from the body. Furthermore, in certain embodiments, the end of the linear actuator coupled to the upper link may be disconnected to enable the hood to be manually rotated to the open position.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A hood assembly for a work vehicle, comprising:
   a hood;
   a hood pivot joint configured to pivotally couple the hood to a chassis of the work vehicle, wherein the hood pivot joint is configured to enable the hood to rotate between an open position and a closed position, and the hood pivot joint is positioned at a rear portion of the hood; and
   a lift mechanism, comprising:
   a linkage assembly comprising a lower link and an upper link pivotally coupled to one another, wherein the upper link is pivotally coupled to the hood at a front portion of the hood, and the lower link is configured to pivotally couple to the chassis of the work vehicle; and
   a linear actuator configured to drive the linkage assembly to rotate the hood between the open and closed positions, wherein the linear actuator is pivotally coupled to the lower link and to the upper link, wherein the lower link has an opening configured to receive a portion of the linear actuator while the hood is in the closed position.

2. The hood assembly of claim 1, wherein the lift mechanism comprises a strut pivotally coupled to the lower link and to the upper link.

3. The hood assembly of claim 2, wherein the strut is pivotally coupled to the lower link at a strut pivot joint, the linear actuator is pivotally coupled to the lower link at a linear actuator pivot joint, and the strut pivot joint and the linear actuator pivot joint are substantially coaxial.

4. The hood assembly of claim 2, wherein the strut is pivotally coupled to the upper link at a strut pivot joint, the linear actuator is pivotally coupled to the upper link at a linear actuator pivot joint, and the strut pivot joint and the linear actuator pivot joint are substantially coaxial.

5. A hood assembly for a work vehicle, comprising:
   a hood;
   a hood pivot joint configured to pivotally couple the hood to a chassis of the work vehicle, wherein the hood pivot joint is configured to enable the hood to rotate between an open position and a closed position, and the hood pivot joint is positioned at a rear portion of the hood; and
   a lift mechanism, comprising:
   a linkage assembly comprising a lower link and an upper link pivotally coupled to one another, wherein the upper link is pivotally coupled to the hood at a front portion of the hood, and the lower link is configured to pivotally couple to the chassis of the work vehicle; and
   a linear actuator configured to drive the linkage assembly to rotate the hood between the open and closed positions, wherein the linear actuator is pivotally coupled to the lower link and to the upper link, and wherein the linear actuator is pivotally coupled to the lower link at a linear actuator pivot joint, the linear actuator pivot joint comprises a pin configured to selectively release the linear actuator from the lower link to enable the hood to be manually rotated from the closed position to the open position, and the hood has an opening configured to facilitate access to the pin while the hood is in the closed position.

6. A hood assembly for a work vehicle, comprising:
   a hood;
   a support structure coupled to the hood;
   a hood pivot joint configured to pivotally couple the hood to a chassis of the work vehicle, wherein the hood pivot joint is configured to enable the hood to rotate between an open position and a closed position;
   a mount configured to couple to the chassis of the work vehicle; and
   a lift mechanism, comprising:
      a linkage assembly comprising a lower link and an upper link pivotally coupled to one another, wherein the upper link is pivotally coupled to the support structure, and the lower link is pivotally couple to the mount; and
      a linear actuator configured to drive the linkage assembly to rotate the hood between the open and closed positions, wherein the linear actuator is pivotally coupled to the lower link and to the upper link;
      a first strut pivotally coupled to the lower link and to the upper link; and
      a second strut pivotally coupled to the lower link and to the upper link,
      wherein the first and second struts are positioned on opposite lateral sides of the upper and lower links.

7. The hood assembly of claim 6, wherein the upper link has a recess configured to receive the mount while the hood is in the closed position.

8. The hood assembly of claim 6, wherein the lift mechanism comprises a pivot assembly configured to pivotally couple the linear actuator to the upper link, and the pivot assembly comprises a resilient bushing.

9. The hood assembly of claim 6, wherein the linear actuator comprises an electric linear actuator.

* * * * *